United States Patent [19]
Frates et al.

[11] Patent Number: 5,657,904
[45] Date of Patent: Aug. 19, 1997

[54] HIGH FLOW MELTING GRID AND MELTER UNIT

[75] Inventors: Paul S. Frates, Lawrenceville; Gregory J. Gabryszewski, Lithonia, both of Ga.

[73] Assignee: Nordson Corporation, Westlake, Ohio

[21] Appl. No.: 545,427

[22] Filed: Oct. 17, 1995

[51] Int. Cl.$^6$ ...................................................... B67D 5/62
[52] U.S. Cl. ..................................... 222/146.5; 219/421
[58] Field of Search ................. 222/1, 146.5, 185.1, 222/325, 330; 219/421, 422, 525, 530; 126/343, 5 A

[56] References Cited

U.S. PATENT DOCUMENTS

| | | |
|---|---|---|
| 2,544,661 | 3/1951 | Fossa . |
| 2,851,577 | 9/1958 | Bolds et al. . |
| 2,987,599 | 6/1961 | Voss . |
| 3,352,279 | 11/1967 | Lockwood . |
| 3,377,466 | 4/1968 | Paulsen . |
| 3,531,023 | 9/1970 | Mercer . |
| 3,561,426 | 2/1971 | Wheeler ..................... 126/343.5 A |

(List continued on next page.)

FOREIGN PATENT DOCUMENTS

| | | |
|---|---|---|
| 953733 | 4/1964 | United Kingdom . |
| 1223674 | 3/1971 | United Kingdom ............ 126/343.5 A |

OTHER PUBLICATIONS

Brochure, "Hot–Melt Processors", May Coating Technologies, Inc., 2280 Terminal Road, S. Paul, MN 55113.
Brochure, "200/400 Series Hot–Melt Drum Unloaders", May Coating Technologies, Inc., 2280 Terminal Road, S. Paul, MN 55113.
Sta–Warm Brochure, "Coated Fabric", Sta–Warm Electric Company, Inc., North Chestnut Street, Ravenna, Ohio 44266, PB #7.
Sta–Warm Brochure, "Glue Melting Equipment", Sta–Warm Electric Company, Inc., North Chestnut St., Ravenna, Ohio 44266, G–8.

(List continued on next page.)

Primary Examiner—Philippe Derakshani
Attorney, Agent, or Firm—Wood, Herron & Evans, L.L.P.

[57] ABSTRACT

A melting grid, and melter unit provided with such a melting grid which achieves high melting rates and flow rates. The melting grid is generally formed with two intersecting sets of grid members with each set being formed from a plurality of grid members. The first set of grid members includes tapered, converging side surfaces extending up to a leading edge disposed at a height above the leading edges of the second set of grid members. The grid members of the second, lower set also have tapered or converging side surfaces extending toward a leading edge, however, these surfaces converge toward one another at a greater angle than the side surfaces of the higher set such that the higher level grid members of the first set have more gradual tapers than the lower level grid members of the second set.

29 Claims, 4 Drawing Sheets

U.S. PATENT DOCUMENTS

| | | |
|---|---|---|
| 3,876,105 | 4/1975 | Kelling . |
| 3,952,921 | 4/1976 | Tanner . |
| 3,964,645 | 6/1976 | Scholl . |
| 3,981,416 | 9/1976 | Scholl . |
| 4,024,854 | 5/1977 | Park et al. . |
| 4,308,447 | 12/1981 | Nötzold et al. . |
| 4,474,311 | 10/1984 | Petrecca . |
| 4,505,669 | 3/1985 | Rogers . |
| 4,641,764 | 2/1987 | Faulkner, III . |
| 4,666,066 | 5/1987 | Boccagno et al. . |
| 4,667,850 | 5/1987 | Scholl et al. . |
| 4,724,983 | 2/1988 | Claassen . |
| 4,771,920 | 9/1988 | Boccagno et al. . |
| 4,811,863 | 3/1989 | Claassen . |
| 4,821,922 | 4/1989 | Miller et al. . |
| 4,848,420 | 7/1989 | Claassen . |
| 4,850,425 | 7/1989 | Anderson . |
| 4,898,527 | 2/1990 | Claassen . |
| 4,919,308 | 4/1990 | Majkrzak . |
| 5,027,743 | 7/1991 | Ludwig ........................... 126/343.5 A |
| 5,353,945 | 10/1994 | Frates et al. ........................ 222/146.5 |

OTHER PUBLICATIONS

Sta–Warm Brochure, "Aid Plastic Coated Pipe Production", Sta–Warm Electric Company, Inc., North Chestnut St., Ravenna, Ohio 44266, Republic Steel Inst.

Sta–Warm Brochure, "Aid Plastic Coated Pipe Production", Sta–Warm Electric Company, Inc., North Chestnut St., Ravenna, Ohio 44266, Hill–Hubbell Inst.

Drawing, "Hot Melt Adhesive Tank", Sta–Warm Electric Company, Inc., North Chestnut Street, Ravenna, Ohio 44266.

Drawing, Sta–Warm AD 32 55 Compound Melter #34C21570, Jan., 1964.

Drawing, Sta–Warm Dwios Drum Warmer #34B27840 2/2, Oct. 1969.

HIGH FLOW MELTING GRID AND MELTER UNIT

FIELD OF THE INVENTION

The present invention relates generally to melting grids used for melting thermoplastic materials, and particularly to such grids used in hopper type melter units for melting hot melt adhesives.

BACKGROUND OF THE INVENTION

So-called "hot melt" adhesives are used for various coating and bonding operations such as diaper construction, package forming, automobile parts assembly and electronics coating. Generally, it is convenient to store and ship the hot melt adhesive materials in bulk forms such as chicklets, slats, pellets and bricks and also in slugs held in containers, such as relatively small one or five gallon pails, or in containers as large as 55 gallon drums depending on the quantity necessary for the application.

Hopper-type dispensers may be used to melt and dispense many forms of hot melt adhesives including those mentioned above. In the case of bulk adhesive in the form of a slug held in a container, hopper-type dispensers are used to first remove the slug from the container and then to melt the slug of adhesive as it contacts a heated melting grid mounted near the bottom of the hopper. Other forms of adhesive may simply be loaded into the hopper. A heated reservoir is usually disposed beneath the melting grid and receives the melted or liquified hot melt adhesive as it passes through the grid and then maintains the adhesive in a heated liquid state suitable for the application. An outlet of the reservoir typically leads to a pump and manifold assembly for pumping the hot melt adhesive to a dispenser appropriate for the application.

The melting grids in hopper type melter units are the primary devices for transforming the adhesive from its initial form into a molten or at least semi-molten state. Melting grids may consist of various forms of heated members which melt the adhesive on contact. The grid also includes through passages for the melted adhesive. To maximize the melting rate, it is generally desirable to increase the number of heated grid members to create maximum heated surface contact with the end of the adhesive slug. However, the through passages between the grid members must be large enough to prevent back up of melted adhesive above the grid and to allow sufficient flow of melted adhesive into the reservoir to maintain the supply of liquid adhesive to the dispenser. Finally, the grid must also be strong enough to support the weight of the adhesive which may be on the order of several hundred pounds in the case of a 55 gallon drum of adhesive.

On account of the competing desirable grid characteristics noted above, certain problems and trade-offs must be addressed when designing melting grids. For example, if the individual grid members are too numerous, too wide and/or too closely spaced, then there may be a high melt rate, however, the through passages between the grid members will be too small and the flow rate through the grid too low. On the other hand, if there are not enough grid members, or the grid members are too narrow or too widely spaced, then there may not be enough surface area contact between the grid members and the adhesive in the hopper to achieve a necessary or desirable melt rate. In addition, in this latter case the grid might be too weak to repeatedly support the weight of heavy adhesive slugs over an acceptable length of time or "useful life".

In general, therefore, a need has existed for a melting grid which produces relatively high melt rates and flow rates and which is further able to support the weight of the adhesive in its initial form over a long useful life.

SUMMARY OF THE INVENTION

The present invention provides a melting grid used for melting thermoplastic materials. Preferably, but not exclusively, the melting grid of the present invention is used in hopper type adhesive melting apparatus The grid achieves high melting rates and flow rates and is also strong enough to support the weight of the large masses of adhesive, such as the large adhesive slugs used in high production applications. The melting grid is generally formed with two intersecting sets of grid members with each set being formed from a plurality of elongated grid members. The first set of grid members includes tapered, converging side surfaces extending up to a leading edge disposed at a height above the leading edges of the second set of grid members. The grid members of the second, lower set also have tapered or converging side surfaces extending toward a leading edge, however, these surfaces converge toward one another at a greater angle than the side surfaces of the higher set such that the higher level grid members have more gradual tapers than the lower level grid members. The grid is preferably cast from a highly heat conductive material such as aluminum.

The higher level grid members partially vertically overlap the lower level grid members such that the bottom of each high level grid member is disposed above the respective bottoms of the low level grid members. This opens up the lower portion of the grid for improved flow. Specifically, the bottom of each high level grid member is disposed at substantially the same height as lower edges of the tapered surfaces of the low level grid members. For reasons which will become apparent, the bottoms of the high level grid members are much more narrow in cross sectional width than the bottoms of the low level grid members.

The grid members within each respective set are preferably parallel to one another and the members are heated to allow the narrow high level grid members to initially melt and slice through a mass of adhesive whether the mass is composed of chicklets, slats, bricks or the like or if it is an adhesive slug. In the example of the preferred embodiment, forced contact is made between the adhesive and the grid simply by allowing the weight of the bulk adhesive, such as a slug, to bear down on the grid within the hopper unit. The sliced and partially melted adhesive then contacts the lower level grid members which further heat, cut and melt the partially melted adhesive before the adhesive passes through the grid in at least a substantially liquid form. In the preferred embodiment, the low level grid members contain heating elements, such as resistance type heating elements, and the high level grid members are in thermal contact with the low level grid members such that they are heated by such contact. Preferably, the thermal contact is established by direct physical contact between the two sets of grid members in regions of overlap therebetween.

As mentioned, the high level grid members each include tapered side surfaces. These surfaces converge upwardly at a taper of between about 5° to 20°, relative to vertical, to a leading edge which may be flat, rounded or sharpened by milling or otherwise finishing the side surfaces. If these tapered surfaces are machined to a sharp apex or leading edge, then an upper section of the high level grid members may have side surfaces which converge at a taper of about 15°. The low level grid members preferably have side surfaces which converge at an angle within the range of about 20° to about 50° relative to vertical, although an angle of about 35° is preferred. If left as cast, the leading edges of the high and low level grid members are generally flat.

In the preferred manner of using a melting grid of the present invention, a container holding a slug of hot melt adhesive having an open lower end is inserted into hopper of the melter unit. The container of hot melt adhesive is heated such that the entire contents of the container are released in the form of a slug. The lower end of the adhesive slug gradually passes through the narrow high level grid members, which slice, heat and soften the hot melt adhesive sufficiently to move the molten and partially molten adhesive between these high level grid members and into the low level grid members. The hot melt adhesive then passes through the low level grid members. As these low level grid members contain heating elements, they further heat and melt the adhesive and, finally, the molten or at least partially molten adhesive falls from the spaces in the grid into the heated reservoir below where the liquid adhesive may be brought completely up to the required application temperature and maintained at that temperature.

From the foregoing, and as will become more apparent from the detailed description to follow, the melting grid of the present invention simultaneously achieves both high melt rates and high flow rates due to the unique two level tapered grid structure. The taller, narrower and more gradually tapered set of grid members provide a slicing action and further provide a long flow path and large area of surface contact with the adhesive to increase the melting rate. The leading edges of the shorter grid members cut the partially melted adhesive pieces passing between the taller grid members into even smaller pieces. In addition, the shorter, wider grid members continue melting the adhesive which is being extruded or pushed between the taller grid members and into the shorter grid members.

These and other objects and advantages of the present invention shall become apparent from the accompanying drawings and the detailed description thereof.

BRIEF DESCRIPTION OF THE DRAWINGS

The accompanying drawings, which are incorporated in and constitute a part of this specification, illustrate a preferred embodiment of the invention and, together with a general description of the invention given above and the detailed description given below, serve to explain the principles of the present invention.

FIG., 1 is a front partial sectional view of a hot melt adhesive system incorporating a high flow melting grid in accordance with the principles of the present invention.

DETAILED DESCRIPTION OF THE PREFERRED EMBODIMENT

Figure 1:
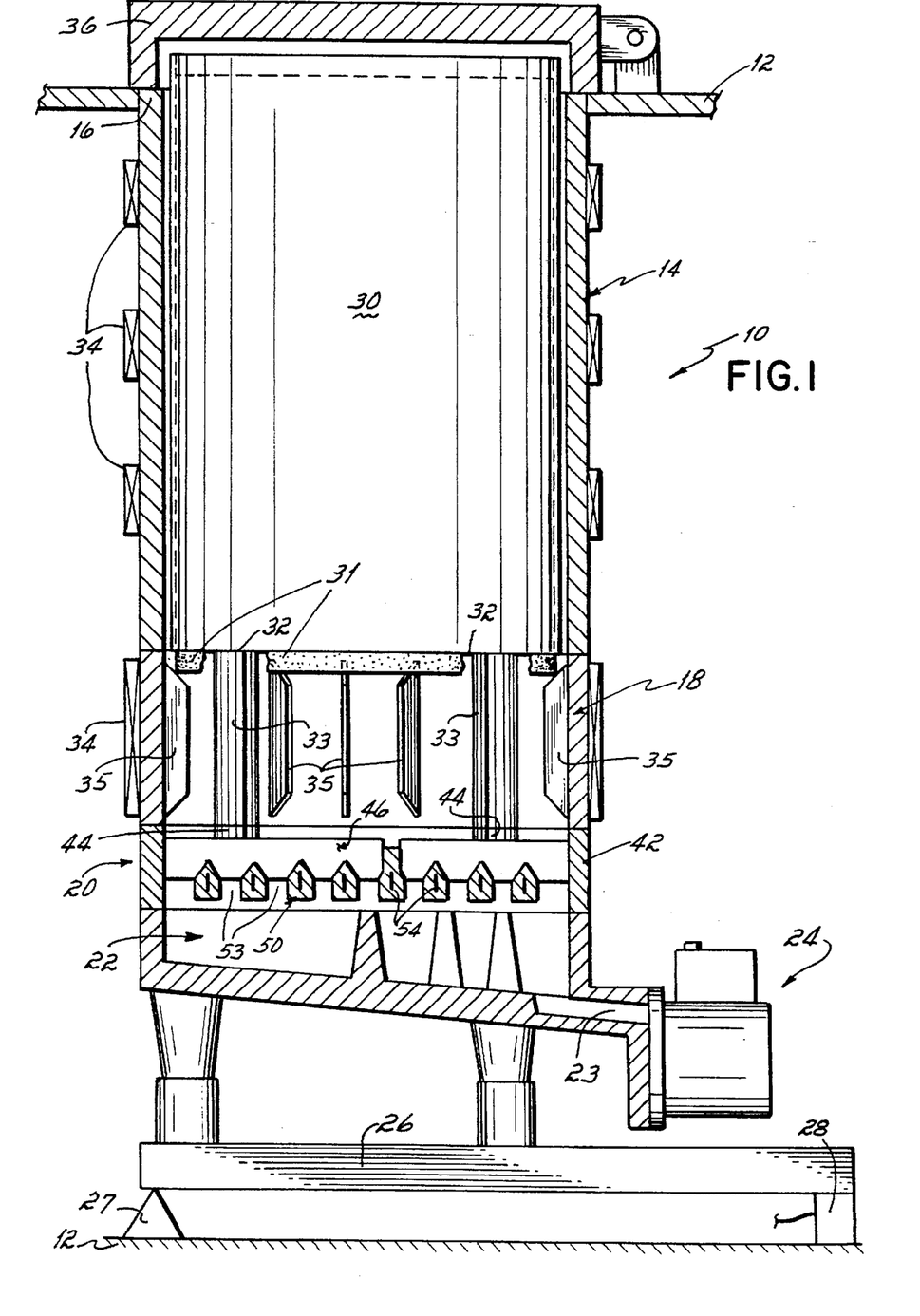
Figure 2:
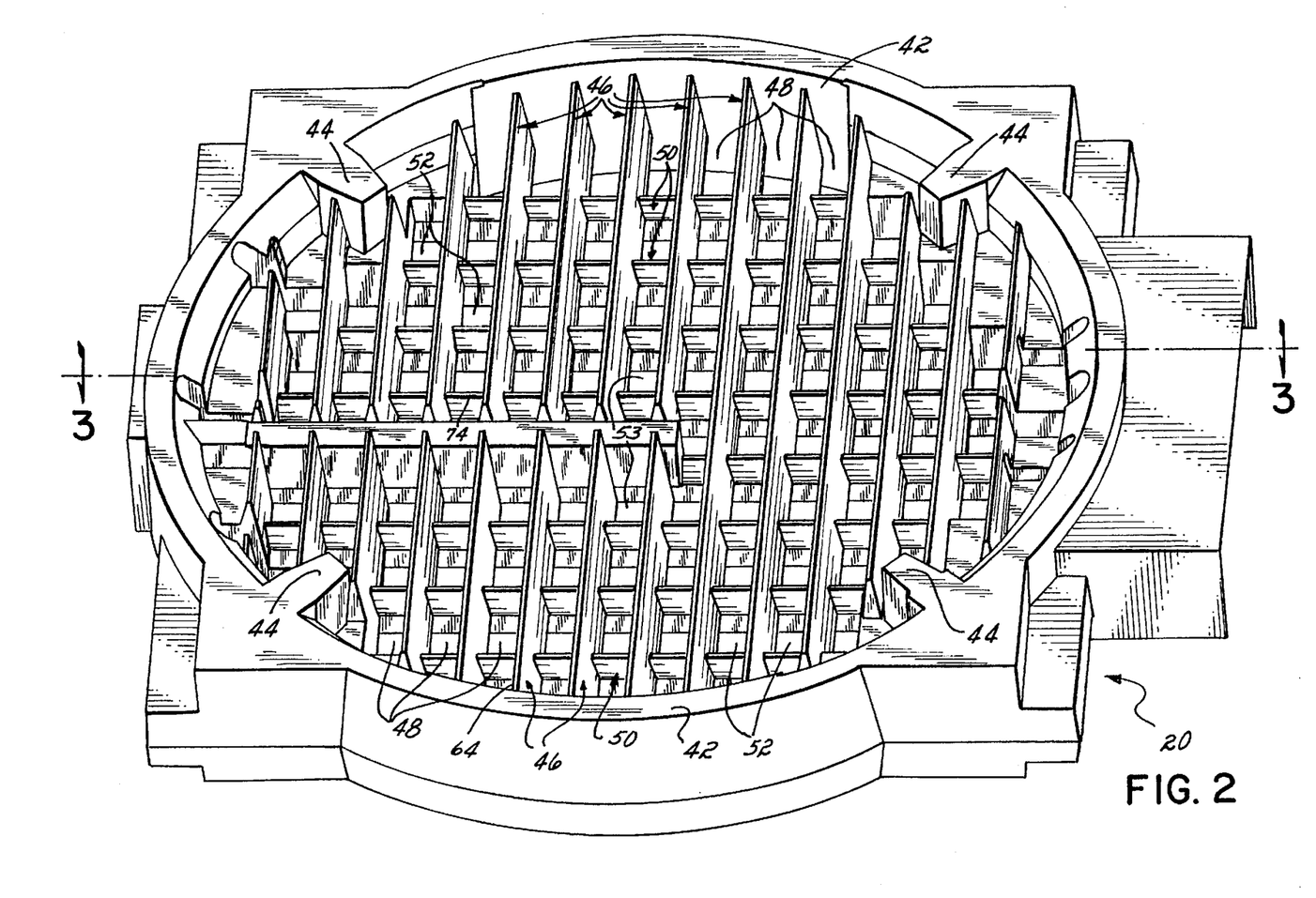
FIG. 2 is a front perspective view of the high flow melting grid in accordance with the principles of the present invention.

With reference first to FIG. 1, there is shown a hot melt adhesive melting and dispensing system 10 for melting and pumping hot melt adhesive to an application dispenser or the like. Generally, hot melt adhesive system 10 comprises a housing 12, a hopper 14 supported therein having an open upper end 16 and a lower end 18. A melting grid 20, constructed in accordance with the principles of this invention, is disposed beneath lower end 18 of hopper 14 and a reservoir 22 is mounted beneath melting grid 20. Reservoir 22 discharges into a pump and manifold assembly 24 through an outlet 23.

Hopper 14 is sized to receive an inverted container 30 of hot melt adhesive. The relative lower end 32 of inverted container 30 is open to permit release of the hot melt adhesive in the form of a slug 31. Preferably, hopper 14 is sized to receive a 55 gallon drum of adhesive, as is common, but hopper 14 and grid 20 may be sized to accommodate containers of other sizes as well. Hopper 14 may also receive adhesive which is simply loaded into hopper 14 from a container or some other supply.

Container 30 is supported within hopper 14 by a plurality of elongate drum supports 33 on which open end 32 rests. A plurality of heating fins 35 are also provided in lower portion 18 of hopper 14. Both drum supports 33 and fins 35 are more fully discussed in co-pending and commonly assigned U.S. patent application Ser. No. 08/539,172, filed Oct. 4, 1995, entitled "Thermoplastic Material Melting Apparatus" (Atty. Docket No. NOR-790), currently pending the disclosure of which is hereby expressly incorporated by referenced herein. Other methods of supporting or suspending container 30 within hopper 14 may also be used without departing from the principles of this invention. A lid 36 which may include a heater (not shown) is provided to cover the upper end of container 30.

Hopper 14, melting grid 20, reservoir 22, and pump and manifold assembly 24 are preferably supported within housing 12 such that they are substantially isolated from the housing 12. To this end, reservoir 22 is mounted on a base 26, which is in turn pivotally supported on housing 12 by a fulcrum 27 and load cell 28. The fulcrum 27/load cell 28 mounting enables the monitoring of the quantity of hot melt adhesive container within hopper 14 and reservoir 22.

Heaters 34 surround hopper 14 and are used to initially heat container 30 and thereby cause the bulk adhesive to be withdrawn in the form of slug 31. Heaters 34 may be either band heaters as shown, cylindrical heaters, or any other heaters that will sufficiently heat the container 30 such that the adhesion between container 30 and the slug 31 of hot melt adhesive is reduced sufficiently to permit slug 31 to drop out of container 30. Specifically, as container 30 is heated, a thin layer of molten hot melt adhesive forms between the inner surface of container 30 and slug 31. This permits slug 31 to slide out of the open lower end 32 of container 30, onto supports 33 and fins 35 and finally onto melting grid 20.

With reference to FIGS. 2–5, melting grid 20 is preferably cast from aluminum and includes a generally cylindrical outer wall 42 having a plurality of inwardly projecting platforms 44 which act as bases on which drum supports stand 33. Extending horizontally across melting grid 20 is a first set of elongated, parallel grid members 46. As will be described further below, grid members 46 are relatively tall and narrow in cross section and taper to an upper leading edge and are referred to herein as high level grid members. A plurality of first channels 48 are formed between the uniformly spaced grid members 46. Grid members 46 are adapted to contact slug 31 (FIG. 1) and to penetrate through and partially melt the adhesive.

Positioned beneath high level grid members 46, and extending across the inside surface of wall 42 in a transverse orientation thereto, are a plurality of elongated parallel low level grid members 50 which are shorter than grid members 46. Low level grid members 50 and high level grid members 46 may be oriented in other transverse orientations than the perpendicular relationship shown without departing from the spirit and scope of the present invention. As with high level grid members 46, low level grid members 50 are spaced substantially uniformly across the diameter of melting grid 20 such that they form a plurality of second channels 52. Cast within low level grid members 50 are respective elongated heating elements 54 (see FIG. 5), such as conventional resistance type heating elements, which may be activated to raise the temperature of low level grid members 50 to render melting grid 20 effective in melting the hot melt adhesive by contact. Moreover, high level grid members 46 are in thermal contact with low level grid members 50, preferably by being cast in direct physical contact therewith, such that heating elements 54 are also effective in heating high level grid members 46 by conduction between grid members 50 and 46.

Figure 3:
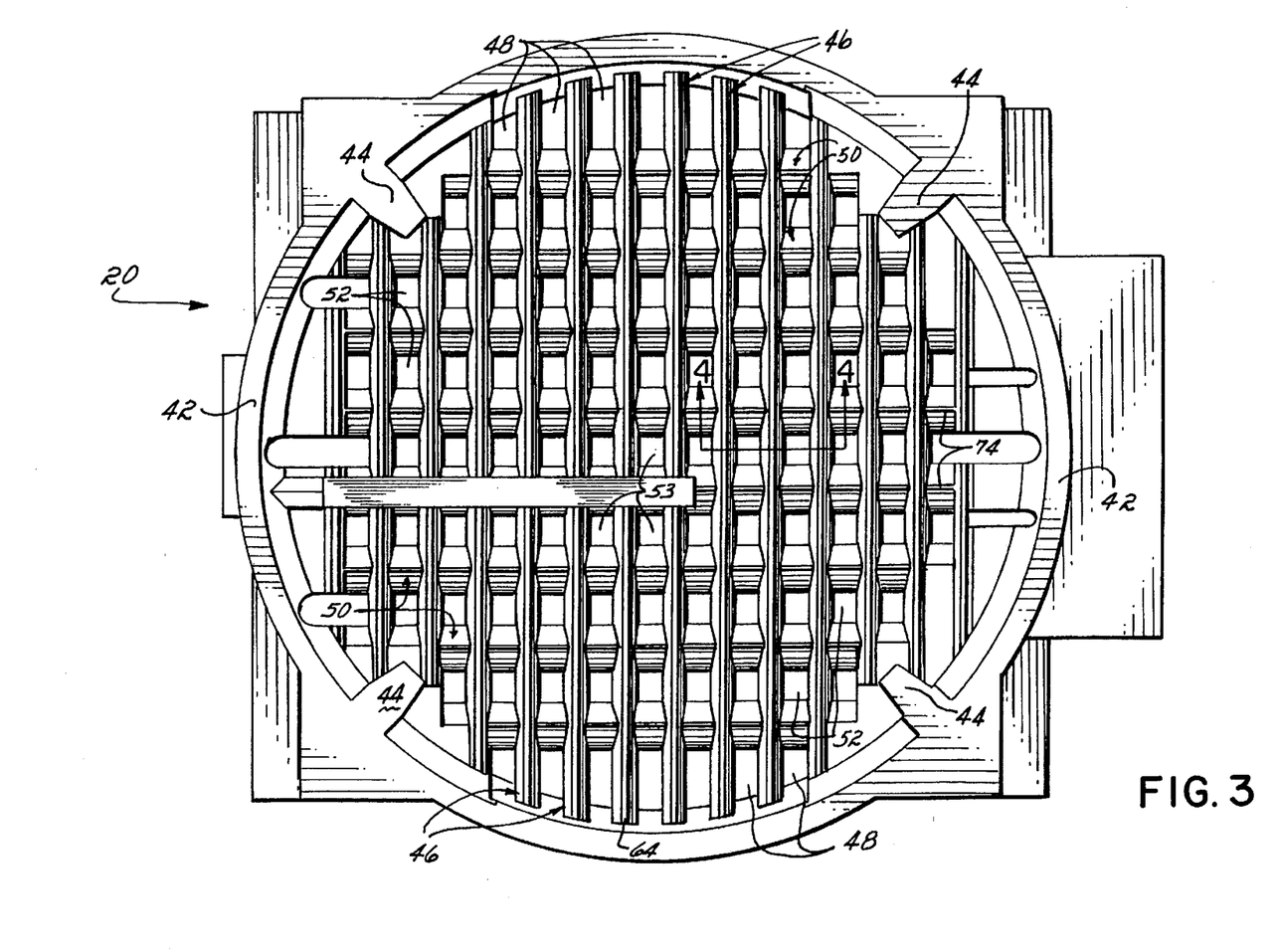
FIG. 3 is a top view of the high flow melting grid as seen on line 3—3 of FIG. 2.

As best seen in FIG. 3, high level grid members 46 and low level grid members 50 are oriented substantially perpendicularly to each other. Thus, high level grid members 46 and low level grid members 50 cooperate to create a lattice work of overlapping first and second channels 48, 52 and respective through passages 53. Melting grid 20 therefore has a large area of heat surface contact with the adhesive and a large total through passage area. As will be discussed below, the large area of heated surface contact between grid 20 and adhesive slug 31 results in a high melting rate and the large total through passage area ensures that the flow of molten material is not impeded by lack of flow area.

Figure 4:
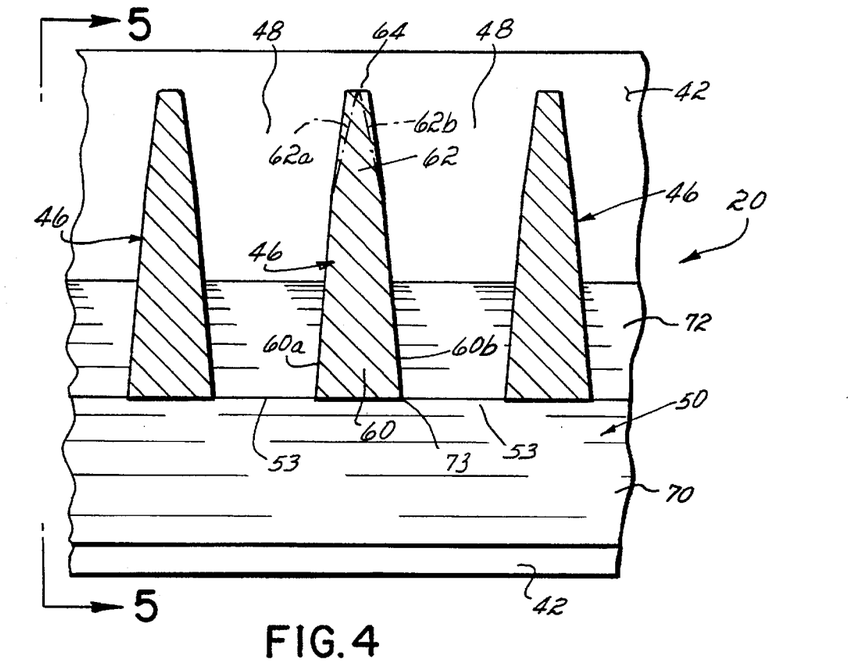
FIG. 4 is a partial sectional view taken along line 4—4 of FIG. 3.
Figure 5:
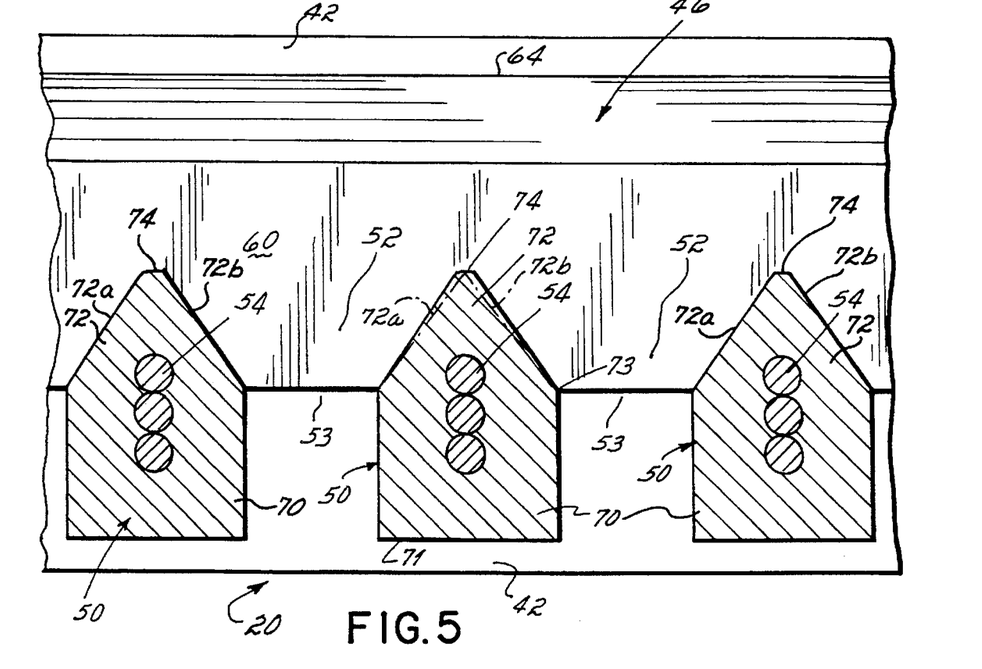
FIG. 5 is a sectional view taken along line 5—5 of FIG. 4.

As will be appreciated by a comparison of FIGS. 4 and 5, in cross section, high level grid members 46 are much more narrow and have longer tapers than low level grid members 50. To this end, high level grid members 46 include a lower section 60 and an upper section 62. As cast, lower section 60 has opposite side walls 60a, 60b which converge upwardly at a taper of about 5° relative to vertical, and may have an upper section 62 having opposite side walls 62a, 62b (as shown in phantom lines) which converge upwardly at a taper of about 7.5° relative to vertical, with upper section 62 terminating in an upper leading edge 64. Leading edge 64 is shown in solid lines to be relatively flat as cast, however, if upper side walls 62a, 62b are machined to have tapers of about 15° relative to vertical as shown in phantom lines, leading edge 64 may be formed into a sharpened edge. This has been found to be helpful and desirable in some applications, especially applications with smaller, lighter pails of adhesive such as one or five gallon sizes. Overall, and generally speaking, it is important to have the higher, narrower and more gradually tapered grid members 46 contact and slice adhesive slug 31 (FIG. 1) into strips before it contacts low level grid members 50. Generally, it has been found to be advantageous to form high level grid members 46 about twice as narrow at their base than low level grid members 50 and to have high level grid members 46 extend about an inch to two inches above low level grid members 50.

Referring specifically to FIG. 5, low level grid members 50 include a lower section 70 and an upper section 72. As cast, upper section 72 includes opposite side walls 72a, 72b which converge upwardly to a leading edge 74 at a taper of about 35° relative to vertical. The shape of low level grid members 50 as cast are shown in solid lines in FIG. 5. As with high level grid members 46, a certain amount of improved performance may be obtained in some applications if side walls 72a, 72b of upper section 72 are machined to a sharpened leading edge 74, as shown in phantom lines, following casting.

Still referring to FIGS. 4 and 5, high level grid members 46 do not extend down to the bases 71 of low level grid members 50. Instead, high level grid members 46 overlap low level grid members 50 by only about one inch, or only to the intersection 73 between upper section 72 and lower section 70. This overlap was found to be sufficient to provide the necessary thermal transmission from low level grid members 50 to high level grid members 46 and the lack of any portion of high level grid members 46 between lower sections 70 of low level grid members can lead to improved flow through grid 20. Moreover, by orienting low level grid members 50 perpendicularly to high level grid members 46, more of the hot melt adhesive is contacted by the melting surfaces of melting grid 20.

It has been found that providing first channels 48 having a width of about one inch results in a melting grid 20 having good throughput. With respect to second channels 52, the spacing of low level grid members 50 was selected to provide a flow path of about one inch. This spacing was found to provide the desired flow capacity for melting grid 20. With these channel sizes, it was found that, for a melting grid having a diameter of about 23 inches, 14 high level grid members 46 could be spaced substantially equally across the diameter of melting grid 20. Similarly, 8 low level grid members 50 could also be spaced substantially equally across the diameter of melting grid 20.

The high flow capacity of melting grid 20 also permits a higher grid temperature to be used while reducing the risk of charring the adhesive. In particular, it has been found that melting grid 20 can be set above the application temperature rather than just at the application temperature. This provides a two-fold advantage. First, increased temperature of melting grid 20 increases the throughput capacity thereof. Second, as the adhesive temperature remains below the actual operating temperature, overheating and degradation of the adhesive is prevented. Thus, although the adhesive passing through melting grid 20 may not be raised completely up to the application temperature, less heat must be added to the adhesive by the conventional heaters in reservoir 22 than with existing hot melt adhesive systems.

To reduce the likelihood of damage to grid members 46, adhesive slug descent control members 33 and/or 35 (FIG. 1) are provided above grid 20 as disclosed and claimed in the above incorporated patent application.

In use, a container 30 of hot melt adhesive 31 is inserted into hopper 14. Band heaters 34 are energized to heat hopper 14 and container 30 to thereby melt the adhesive in contact with the outside walls of container 30. After enough molten hot melt adhesive forms along the inside surface of container 30, adhesive slug 31 falls from hopper 14 and contacts supports 33 and fins 35 (see FIG. 1) which slow down the descent of slug 31. Slug 31 then contacts high level grid members 46 which penetrate and partially melt the mass hot melt adhesive 31. As slug 31 continues to melt, the sliced adhesive passes through channels 48 and contacts low level grid members 50, which further melt and move the hot melt adhesive downwardly through channels 52 and through passages 53 and into reservoir 22. The molten or at least substantially molten hot melt adhesive is then completely melted within reservoir 22 and brought up to application temperature. Finally, the adhesive is discharged from reservoir 22 through outlet 23 to the pump and manifold assembly 24 and subsequently pumped to an appropriate dispenser.

While the present invention has been illustrated by description of an embodiment which has been described in considerable detail, it is not the intention of the applicant to restrict or in any way limit the scope of the appended claims to such detail. Additional advantages will readily appear to those skilled in the art. Thus, the invention in its broadest aspects is not limited to the specific details, representative apparatus and method, and illustrative examples shown and described. Accordingly, departures may be made from the details without departing from the spirit or scope of applicant's general inventive concept.

What is claimed is:

1. A high flow melting grid used for melting a mass of material, the melting grid comprising:

first and second sets of elongated grid members intersecting to form a grid structure having through passages between the intersecting grid members, said first set of grid members formed by a plurality of high level grid members and said second set of grid members formed by a plurality of low level grid members, said high and low level grid members being tapered and having side surfaces which converge upwardly toward respective leading edges, wherein the leading edges of said high level grid members are disposed above the leading edges of said low level grid members; and, a heater device operatively connected to at least one of said first and second sets of grid members.

2. The melting grid of claim 1 wherein heating elements are contained within said low level grid members and said first and second sets of grid members are in thermal contact with one another so as to transfer heat from said low level grid members to said high level grid members.

3. The melting grid of claim 2 wherein said first and second sets of grid members are in direct physical contact with each other so as to transfer heat by conduction from said low level grid members to said high level grid members.

4. The melting grid of claim 2 wherein opposite side surfaces of said high level grid members taper upwardly toward one another at a smaller angle relative to vertical than opposite side surfaces of said low level grid members.

5. The melting grid of claim 1 wherein opposite side surfaces of said high level grid members taper upwardly toward one another at a smaller angle relative to vertical than opposite side surfaces of said low level grid members.

6. The melting grid of claim 5 wherein said high level grid members partially vertically overlap said low level grid members, each high level grid member having a bottom disposed above respective bottoms of said low level grid members.

7. The melting grid of claim 6 wherein the bottom of each high level grid member is disposed at substantially the same height as lower ends of the opposite side surfaces of said low level grid members.

8. The melting grid of claim 1 wherein said high level grid members partially vertically overlap said low level grid members, each high level grid member having a bottom disposed above respective bottoms of said low level grid members.

9. The melting grid of claim 8 wherein the bottom of each high level grid member is disposed at substantially the same height as lower ends of the opposite side surfaces of said low level grid members.

10. The melting grid of claim 1 wherein said high level grid members are substantially parallel to one another.

11. The melting grid of claim 10 wherein said low level grid members are substantially parallel to one another.

12. The melting grid of claim 11 wherein said low level grid members are oriented substantially perpendicularly to said high level grid members.

13. The melting grid of claim 1 wherein opposite side surfaces of said high level grid members converge upwardly at an angle of between about 5° and about 20° relative to vertical.

14. The melting grid of claim 13 wherein opposite side surfaces of said low level grid members converge upwardly at an angle of between about 20° and about 50° relative to vertical.

15. The melting grid of claim 13 wherein the leading edges of said high level grid members comprise sharpened edges.

16. The melting grid of claim 1 wherein the leading edges of said high level grid members comprise sharpened edges.

17. A substantially circular aluminum melting grid comprising:

first and second sets of elongated grid members intersecting to form a grid structure having through passages between the intersecting grid members, said first set of grid members comprised of high level grid members and said second set of grid members comprised of low level grid members, said high and low level grid members being tapered members having side surfaces which converge upwardly toward respective leading edges, opposite side surfaces of said high level grid members tapering upwardly toward one another at a smaller angle relative to vertical than opposite side surfaces of said low level grid members, and wherein the leading edges of said high level grid members are disposed above the leading edges of said low level grid members and said high level grid members partially vertically overlap said low level grid members such that bottoms of each high level grid member are disposed above respective bottoms of said low level grid members; and, heating elements contained within said low level grid members.

18. The melting grid of claim 17 wherein said high level grid members are substantially parallel to one another.

19. The melting grid of claim 18 wherein said low level grid members are substantially parallel to one another.

20. The melting grid of claim 19 wherein said low level grid members are oriented substantially perpendicularly to said high level grid members.

21. The melting grid of claim 17 wherein the opposite side surfaces of said high level grid members converge upwardly at an angle of between about 5° and about 20° relative to vertical.

22. The melting grid of claim 21 wherein the opposite side surfaces of said low level grid members converge upwardly at an angle of between about 20° and about 50° relative to vertical.

23. The melting grid of claim 21 wherein the leading edges of said high level grid members comprise sharpened edges.

24. The melting grid of claim 17 wherein the leading edges of said high level grid members comprise sharpened edges.

25. The melting grid of claim 17 wherein said first and second sets of grid members are in direct physical contact with each other so as to transfer heat by conduction from said low level grid members to said high level grid members.

26. A melting unit for melting a mass of hot melt adhesive, the melting unit comprising:

a hopper having an upper open end for receiving a mass of adhesive material and a lower end;

a melting grid mounted at the lower end of said hopper, the melting grid including first and second sets of elongated grid members intersecting to form a grid structure having through passages between the intersecting grid members, said first set of grid members comprised of high level grid members and said second set of grid members comprised of low level grid members, said high and low level grid members being tapered members having side surfaces which converge upwardly toward respective leading edges, wherein the leading edges of said high level grid members are disposed above the leading edges of said low level grid members; and, a heater device operatively connected to at least one of said first and second sets of grid members.

27. A melting unit for melting a mass of hot melt adhesive, the melting unit comprising:

a hopper having an upper open end for receiving a mass of adhesive material and a lower end;

a melting grid mounted at the lower end of said hopper, the melting grid including first and second sets of elongated grid members intersecting to form a grid structure having through passages between the intersecting grid members, said first set of grid members comprised of high level grid members and said second set of grid members comprised of low level grid members, said high and low level grid members being tapered members having side surfaces which converge upwardly toward respective leading edges, opposite side surfaces of said high level grid members tapering upwardly toward one another at a smaller angle relative to vertical than opposite side surfaces of said low level grid members, and wherein the leading edges of said high level grid members are disposed above the leading edges of said low level grid members and said high level grid members partially vertically overlap said low level grid members such that bottoms of each high level grid member are disposed above respective bottoms of said low level grid members; and, heating elements contained within said low level grid members.

28. A method of melting a mass of hot melt adhesive comprising:

bearing an end of the mass against a plurality of first elongated grid members of a melting grid, said first grid members being both heated and tapered to initially heat and slice the end of the mass;

passing the sliced end of the mass into a plurality of elongated channels extending lengthwise along said first elongated grid members;

passing the end of the mass into a plurality of second elongated grid members which intersect said first elongated grid members, said second elongated grid members being heated and tapered to again heat and slice the end of the mass in a direction transverse to the first elongated grid members after the end has passed through said elongated channels; and, discharging molten adhesive from through passages contained between the intersecting first and second elongated grid members.

29. The method of claim 28 wherein the step of bearing the end of said mass against said melting grid further comprises placing said mass on the melting grid with said melting grid disposed at a lower end of a receiving hopper.

* * * * *